(No Model.)

H. C. SCHMIDT.
BALL VALVE OR COCK.

No. 581,373. Patented Apr. 27, 1897.

WITNESSES
Dan'l Fisher
Harry Constantine

INVENTOR
Henry Chatard Schmidt,
by G.H. & W.T. Howard,
Atty.

UNITED STATES PATENT OFFICE.

HENRY CHATARD SCHMIDT, OF BALTIMORE, MARYLAND.

BALL VALVE OR COCK.

SPECIFICATION forming part of Letters Patent No. 581,373, dated April 27, 1897.

Application filed April 15, 1896. Serial No. 587,577. (No model.)

*To all whom it may concern:*

Be it known that I, HENRY CHATARD SCHMIDT, of the city of Baltimore and State of Maryland, have invented certain Improvements in Ball Valves or Cocks, of which the following is a specification.

This invention relates to certain improvements in that class of devices which are designed to effect the filling of tanks and which are automatically closed or shut off when a certain depth of water in the tank is obtained.

In the further description of the said invention which follows reference is made to the accompanying drawings, forming a part hereof, in which—

Figure 1:
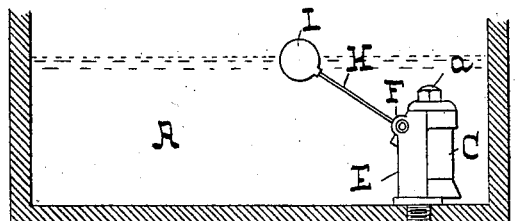
Figure 2:
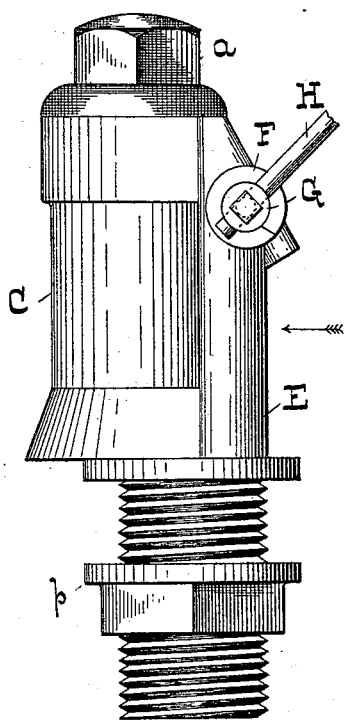
Figure 3:
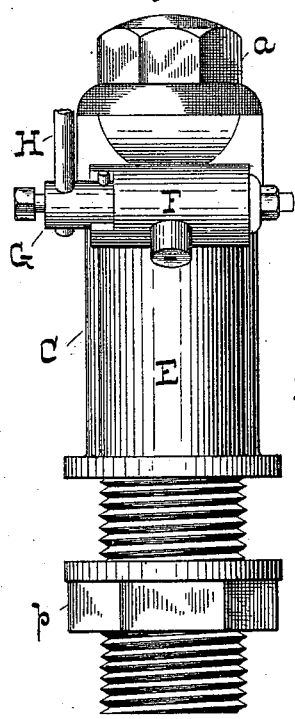
Figure 4:
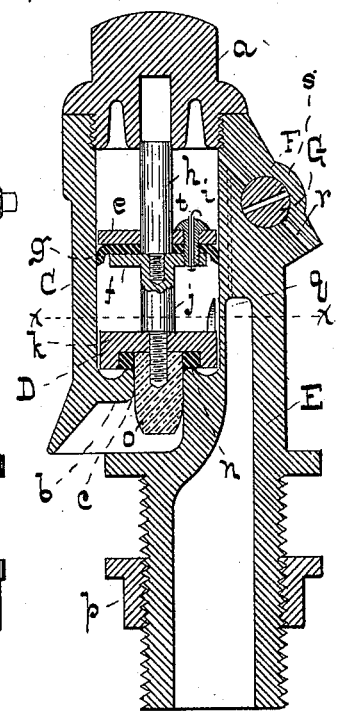
Figure 5:
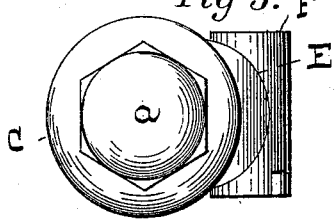
Figure 6:
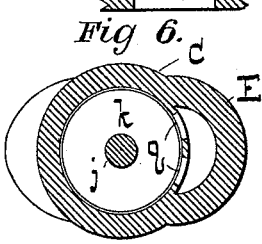

Figure 1 is a partly-sectional view of a portion of a tank provided with the improved ball-cock. Fig. 2 is an enlarged exterior side view of the improved cock with the exception of the float-ball and a part of its lever. Fig. 3 is an exterior view of Fig. 2, looking in the direction indicated by the arrow. Fig. 4 is a central vertical section of Fig. 2. Fig. 5 is a top view of Fig. 2 with certain parts thereof removed. Fig. 6 is a cross-section of Fig. 4, taken on the dotted line $x\ x$.

Referring now to the drawings, A is a tank, (shown only in Fig. 1,) in the bottom of which the ball-cock is secured.

C is a cylinder which is closed at the top by a screw-cap $a$. Centrally of the bottom $b$ of the cylinder is a circular hole $c$, and around this hole is a raised valve-seat.

Within the cylinder C is a piston formed of two disks $e$ and $f$ and an interposed cup-leather $g$. A stem $h$ is screwed into the lower piston-disk $f$, and the upper disk is secured to the lower one by a screw $i$, so as to clamp the cup-leather. The upper end of the stem $h$ rests in a cavity in the screw-cap $a$ and slides loosely therein as the piston is moved. A second stem $j$ in alinement with the first one $h$ is formed as a part of the disk $f$, and it is screwed into a valve D, formed of a disk $k$, loose in the cylinder, and a plug $o$, having a tapered end adapted to pass through the hole $c$ in the bottom $b$ of the cylinder C. The joint is formed by a rubber ring or gasket $n$.

At one side of the cylinder C is a chamber E, which extends below the said cylinder, where it is enlarged and forms an entrance-passage for water. The wall of this extension is threaded to admit of the valve being fastened to the bottom of the tank A and also to allow of connection to the water-service pipe. A nut $p$ is used to hold the valve securely to the tank. In the partition-wall between the cylinder C and chamber E are two passages $q$ to admit water under pressure to the interior of the cylinder.

F is a boss on the side wall of the cylinder C, which forms the casing of a cock the key of which is denoted by G. The waterway through the cock-casing is marked $r$ and the one through the key denoted by $s$.

The portion of the cock-key exterior of the casing is provided with a lever H, having a float-ball I at its end.

The screw $i$, which clamps the disks $e$ and $f$ to the interposed cup-leather $g$, is perforated, and through the hole is inserted a wire $t$, having a head at its lower end. The upper end of the wire is bent over to prevent the wire from falling down. The wire is slightly smaller than the hole. Consequently there is a space around it for the passage of water from underneath to above the piston.

The straight part of the wire $t$ is somewhat longer than the screw in which it rests, so that it has some independent vertical movement to keep the space around it free from any accumulation of mud. An aperture as small as the one used, if unprovided with some clearing device, would soon become clogged and the operation of the entire apparatus be suspended. The head of the wire $t$ is not in any sense of the word a valve to form a tight joint, but merely a stop to prevent the wire from passing from the screw, and water can pass it at all times.

By running the wire $t$ through the screw $i$ instead of directly through the disks $e$ and $f$ and the cup-leather $g$ a clean opening is obtained, which would not be the case if the leather should form a part of the wall of the opening, the leather having a tendency to swell by absorption of water and the hole therein to be closed by the constant pressure of the clamping-disks upon the leather.

Supposing that there is sufficient water in the tank A to retain the float-ball I at the height shown and thereby close the waterway $r$ of the cock-casing, no more water can enter the tank for the reason that the full water-pressure is on the discharge-valve D and holds it down. The water above the said valve is in communication with that above the piston through the medium of the space around the wire $t$. As soon as the water in the tank has lowered sufficiently to bring the float-ball I down so as to open the waterway $r$ the water above the piston escapes through the waterway to the tank. The piston is then raised by the water-pressure below it, the space around the wire $t$ not being large enough to supply the deficiency occasioned by the escape through the cock-key. As the piston rises the valve D is lifted from its seat and the plug $o$ withdrawn from the hole $c$. The cup-leather $g$ of the piston serves not only to make the piston tight but also to retard its movement and prevent its striking with force the under side of the cap $a$. This latter effect cannot be obtained by a solid piston or one unprovided with a packing device which is forced out in contact with the wall of the cylinder by the pressure of water. The valve D now being open, water passes directly from the service-pipe to the tank, and this admission of water continues until the float-ball rises high enough to cause the waterway $r$ to be again closed, when, the bottom of the cap $a$ serving as an abutment for the water, the force of water causes the valve D to close. The closing of the valve D is at first slow, as the water to close it has to pass with little force through the small passage around the wire $t$; but as soon as the plug $o$ enters the hole $c$ and nearly closes it water under full force passes the wire, and the space above the piston being rapidly filled the valve D is suddenly closed, and remains closed until the water in the tank is again lowered.

From the foregoing description it will be understood that a very small float-ball may be used, as it has not to close any valve subjected to water-pressure and that the valve which directly controls the admission of water to the tank is opened and closed by the full pressure of the water in the service-pipe. With such construction it is impossible for the tank to overflow, an accident which commonly occurs when the office of the float-ball is to directly close a valve against the water-pressure.

I claim as my invention—

In an apparatus for the purpose described, the combination of a cylinder having an exterior chamber in communication therewith by means of passages in the wall of the cylinder, a valve adapted to seat in the said cylinder and thereby close the discharge-opening therefrom, having a stem carrying a piston formed of two disks and an interposed cup-leather, a clamping-screw for the disks provided with a hole which extends entirely through it, a wire which is loose in the said hole, adapted to have an independent endwise movement limited by a non-hole-closing stop at each end, a perforated cock-key in the wall of the said cylinder to control a waterway leading from the exterior of the chamber to the space within the cylinder above the piston, and a float-ball to operate the said cock-key, substantially as specified.

HENRY CHATARD SCHMIDT.

Witnesses:
    WM. T. HOWARD,
    DANL. FISHER.